Aug. 23, 1960
R. T. McELHOSE
2,949,675
RADIUS AND CONCENTRICITY GAUGE
Filed March 3, 1959
3 Sheets-Sheet 1
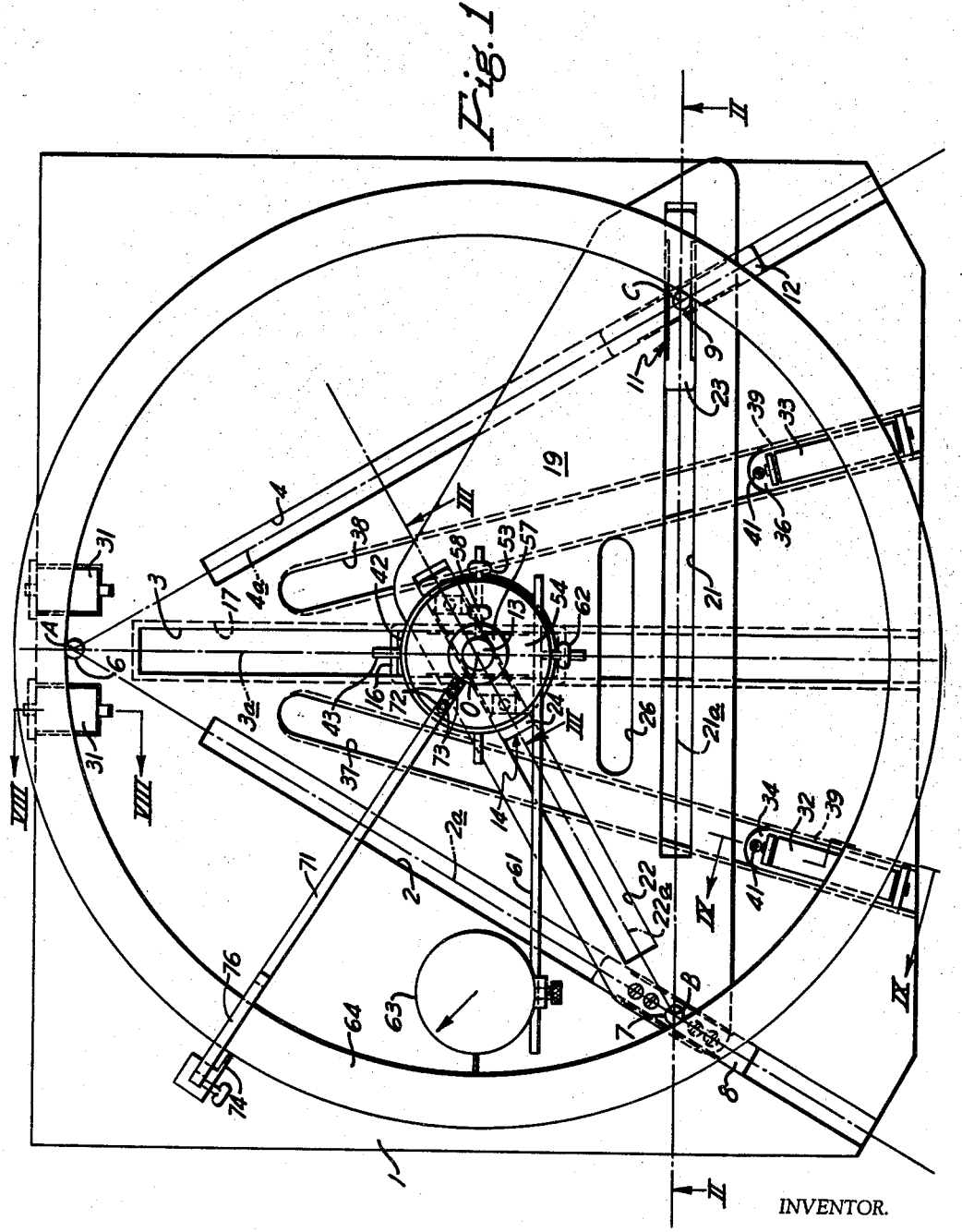
INVENTOR.
ROBERT T. McELHOSE
BY Brown, Critchlow
Flick & Peckham
HIS ATTORNEYS

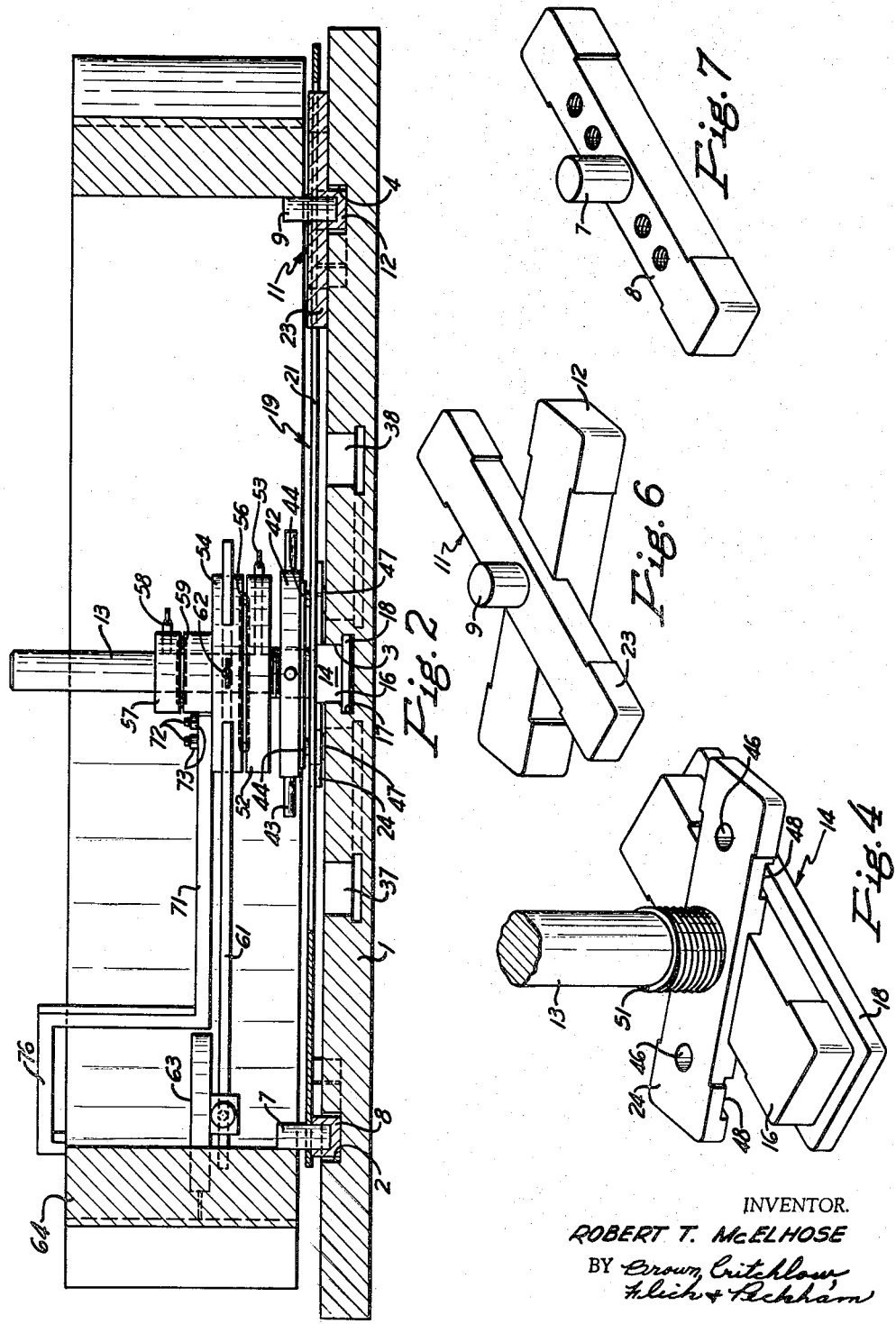

Aug. 23, 1960  R. T. McELHOSE  2,949,675
RADIUS AND CONCENTRICITY GAUGE
Filed March 3, 1959  3 Sheets-Sheet 3
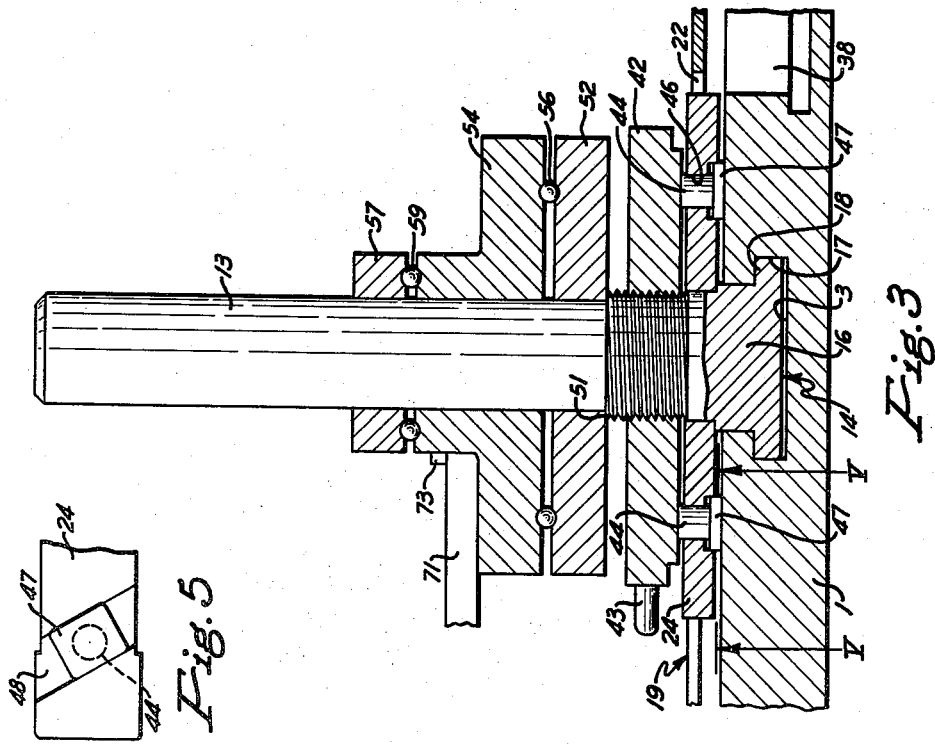
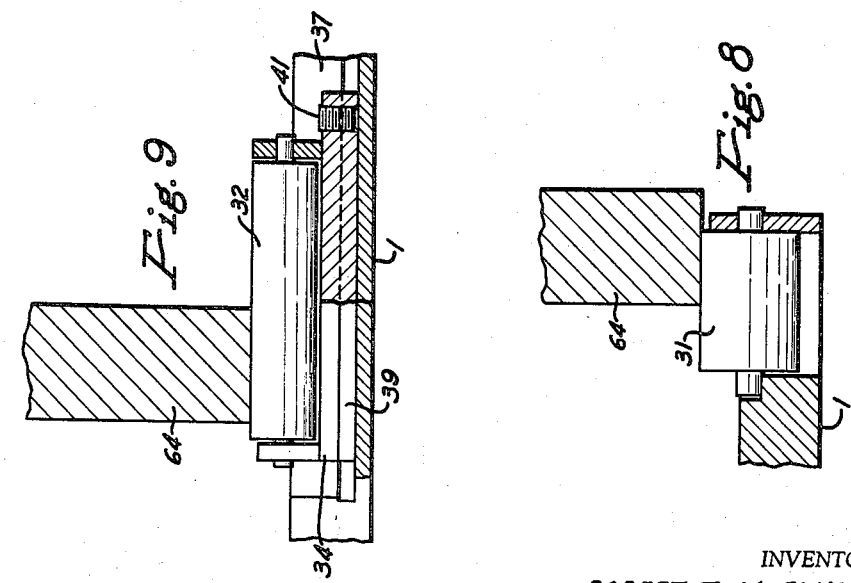
INVENTOR.
ROBERT T. McELHOSE
BY Brown, Critchlow
Flick & Peckham
HIS ATTORNEYS United States Patent Office 2,949,675
Patented Aug. 23, 1960

2,949,675

RADIUS AND CONCENTRICITY GAUGE

Robert T. McElhose, Oakmont, Pa., assignor to Edgewater Steel Company, a corporation of Pennsylvania Filed Mar. 3, 1959, Ser. No. 796,821

7 Claims. (Cl. 33—178)

This invention relates to apparatus for locating the central axis of a surface of revolution or the center of a circular section of that surface, measuring the radius of such section and determining its concentricity. The invention is particularly applicable to measuring the radius and determining the concentricity of sections on the inner and outer surfaces of rings and other interior and exterior surfaces of revolution that must be held to very close tolerances.

It is among the objects of this invention to provide apparatus that will perform the foregoing functions with a very high degree of accuracy and that will be relatively inexpensive to manufacture and simple to use.

Other objects will be apparent from the following description of a preferred embodiment of the invention, in connection with the attached drawings, in which Fig. 1 is a plan view of the device, with a ring positioned thereon;

Fig. 2 is a vertical section along the line II—II of Fig. 1;

Fig. 3 is a vertical section along the line III—III of Fig. 1, showing the details of the center locating element;

Fig. 4 is an isometric view of the compound slide of the center locating element;

Fig. 5 is a bottom view of a portion of that compound slide taken along the line V—V of Fig. 3;

Fig. 6 is an isometric view of the compound slide of one of the locating pins;

Fig. 7 is an isometric view of the single slide of another locating pin;

Fig. 8 is a vertical section along the line VIII—VIII of Fig. 1, showing the fixed roller supports for the object being measured; and Fig. 9 is a similar section along the line IX—IX of Fig. 1, showing one of the adjustable roller supports for such object.

This invention is predicated on the geometrical proposition that three points determine a circle and that, if those points are the vertices of an equilateral triangle, the center of the circle will coincide with the point of intersection of the bisectors of the vertex angles of the triangle or, for that matter, any two of those angles. The apparatus applying this geometrical proposition to attain the stated objects of this invention includes broadly three vertex locating elements defining the vertices of an equilateral triangle, a center locating element within the triangle, and means for simultaneously moving two of the vertex elements along two sides of the triangle towards and away from the third vertex element to define equilateral triangles of varying size and at the same time moving the center locating element along the bisector of the third vertex angle while constraining it to lie on the bisector of one of the other vertex angles.

More specifically, the apparatus comprises means defining three straight reference lines that converge to a fixed reference point in a plane, the first and second reference lines including an angle of 60° and the third reference line bisecting that angle. The fixed reference point represents one vertex of an equilateral triangle. The other vertices are represented by movable reference points. All three reference points may be conveniently represented by points on the axes of three cylindrical locating pins of equal diameter projecting from and normal to the reference plane and adapted to contact a surface of revolution to be measured, or they may be represented by the actual points of contact between that surface and the sides of the locating pins. The movable locating pins are movable only along the first and second reference lines, respectively. A center locating element, conveniently represented by a cylindrical post, is disposed with its axis normal to the plane of the reference lines and is movable only along the third reference line. The two movable pins and the center post are operatively connected by a movable trammel. This trammel is rigidly secured to the first movable locating pin in fixed angular relation to the reference lines. The trammel includes a first guide means for limiting relative movement between the second movable locating pin and the trammel to a defined straight line passing through the reference point on the first movable locating element and disposed at an angle of 60° to each of the first and second reference lines, and also includes a second guide means for limiting relative movement between the center locating element and the trammel to a defined straight line bisecting the 60° angle between the first reference line and the line defined by the first guide means. Accordingly, for all positions of the movable locating pins as constrained by the trammel and the means defining the reference lines, the lines joining the centers (or contacting edges) of all three pins will define an equilateral triangle; and the axis of the center locating element will pass through the point of intersection of the line bisecting the fixed vertex of the triangle and the line bisecting one of the other vertices. This point is the geometrical center of the triangle and of its circumscribed circle and of any circle that is concentric therewith. If a surface of revolution with its axis normal to the plane of the reference lines, is engaged by the sides of the locating pins, the axis of the center locating element will coincide with the axis of revolution of that surface. An adjustable radial arm, rotatably supported by the center locating element, may be used to measure the radius of any circular section of that surface and determine its concentricity.

Referring to the drawings, the apparatus includes a steel bed plate 1, having machined in its top surface three converging grooves or keyways 2, 3, and 4, their longitudinal axes defining three straight reference lines 2a, 3a, and 4a, respectively, that meet at a fixed point A. The angle included between the outer reference lines 2a and 4a is 60°. The middle reference line 3a bisects that angle. A fixed cylindrical locating pin 6 is mounted in a hole in the plate with its axis passing through point A and extending normal to the plane of the reference lines. A movable locating pin 7 is rigidly mounted on a slide or key 8, which is slidably received in groove 2. The axis of pin 7 intersects reference line 2a at B and is also normal to the plane of the reference lines. A second movable locating pin 9 is similarly mounted on a compound slide 11, of which the lower slide 12 is slidably received in groove 4, with the axis of the pin intersecting reference line 4a at C. The locating pins all have the same diameter, so that any surface engaging the sides of the pins will be spaced equally from their axes. A movable center post 13 is similarly mounted on a compound slide 14, of which the lower slide 16 is slidably received in groove 3, the axis of the post intersecting reference line 3a at O. Groove 3 is preferably undercut at 17, as shown in Fig. 2, to provide an inverted T-section, and lower slide 16 is provided with laterally extending flanges 18 extending into those undercut portions.

A trammel 19, which may be made from sheet steel and of generally triangular shape, is supported above the bed plate on slides 8, 12, and 16. The trammel is rigidly secured to slide 8 in fixed angular relation to the reference lines. It is provided with two guide slots 21 and 22. The first guide slot 21 has a longitudinal axis 21a defining a straight line that passes through points B and C, and is at an angle of 60° to the first reference line 2a (and also, by geometry, to line 4a). This slot slidably receives the upper slide 23 of the compound slide 11. The second guide slot 22 has a longitudinal axis 22a defining a straight line that bisects the angle between reference line 2a and line 21a defined by the axis of the first guide slot. This second guide slot slidably receives the upper slide 24 of compound slide 14 supporting the center locating element 13, so that the axis of the center post intersects line 22a. A third slot 26 serves as a convenient handhold for moving the trammel.

As a result of the structure described above, the movement of the trammel is limited to reciprocation along the length of groove 2. Pins 7 and 9 move with the trammel and are constrained by the reference grooves 2 and 4, and pin 9 by slot 21, to form always an equilateral triangle with fixed pin 6. The center locating post 13 likewise moves with the trammel and is constrained by reference groove 3 and slot 22 to have its axis always disposed at the intersection O of the bisectors 3a and 22a of two vertex angles A and B of that triangle (by geometry, O also lies on the bisector of vertex angle C). Therefore, a point on the vertical axis of the central locating element will coincide with the exact center of a true circle tangent to the outer or inner sides of the locating pins.

Plate 1 is provided with fixed supporting rollers 31 on either side of fixed locating pin 6, and also with adjustable rollers 32 and 33 mounted on slides 34 and 36 slidably received in grooves 37 and 38, respectively, in the surface of the plate. These latter grooves are also preferably undercut to provide an inverted T-section and slides 34 and 36 have laterally projecting portions 39 at the bottom to fully engage the keyways. Set screws 41 permit these slides to be secured in desired positions to support various sizes of rings or other bodies of revolution to be measured.

On the center post 13 is threadedly mounted a locking nut 42 provided with projecting handles 43. When the nut is tightened downward, it engages pins 44 loosely received in holes 46 in slide 24 and projecting above that slide. To the bottom of each pin is secured a friction shoe 47 received in a transverse grove 48 in the bottom of slide 24. When the nut is further tightened, these shoes press against the top of plate 1 on either side of groove 3 and, in cooperation with the projecting flanges 18 on slide 16, lock the trammel in the desired position. Above the normal position of locking nut 42, the threaded portion of center post 13 ends in a shoulder 51. Above the shoulder, there is rotatably mounted on the center post a bearing plate 52, which may rest on the shoulder or may be held, by a setscrew 53, in any desired position above the shoulder. A bar holder 54 is rotatably mounted on the center post above the bearing plate and spaced therefrom by thrust bearing 56. An adjustable collar 57, provided with a setscrew 58, and a second thrust bearing 59 keep the bar holder in position.

Slidably mounted in the bar holder and extending horizontally therefrom is a gauge bar 61, preferably of square cross section, adjustably secured to the bar holder by a setscrew 62. On the outer end of this bar is mounted a suitable gauge 63 having a radial stylus for measuring the eccentricity of a ring 64 or similar body of revolution. In addition, a second gauge bar 71 may be mounted on the bar holder on threaded studs 72 at a predetermined distance from the center post and secured on the studs by nuts 73. Bar 71 may be suitably calibrated and provided at its outer end with a vernier stylus 74 for measuring the radius of a surface of revolution. The vernier stylus may be mounted on a straight bar for measuring the inside radius; or, as shown in the drawings, it may be mounted on a bar having a U-shaped portion 76 extending over the top of the ring 64 for measuring the radius of its outer surface.

In using the device, a ring 64 or other annular member to be measured is placed on the supporting rollers, so that the inner surface of the ring (when that surface is one of revolution) engages the fixed locating pin 6. The trammel is then moved, and the ring if necessary shifted laterally, until the second and third locating pins 7 and 9 also engage the inner surface of the ring. The trammel is then locked in position by locknut 42, and the radius and concentricity of the inner surface of the ring are measured. If it is desired to measure the radius and concentricity in different horizontal planes, that can be done by adjusting the height of the bar holder assembly. Similarly, if it is desired to locate the center of the outer surface of the ring (as where it differs from that of the inner surface or where the inner surface is not one of revolution) and measure its radius and concentricity, the ring is positioned on the plate 1, and the trammel manipulated, so that the outer surface of the ring will engage the three locating pins.

It will be readily apparent that the apparatus herein described may be modified by substituting other means than those illustrated for defining the reference lines 2a, 3a, and 4a. For example, instead of doing so by means of the grooves 2, 3, and 4, respectively, they may be defined by straight bars spaced above the top surface of plate 1, the axes of those bars corresponding to the reference lines mentioned. In such case, the movable locating pins 7 and 9 and the center locating element 13 would be mounted on slides that engaged these bars and, preferably, partially embraced them.

It will also be apparent that the reference lines may include lines parallel in space to the reference lines specified herein, so long as the essential geometric relations are preserved between the surface contacting points of the vertex locating elements and the axis of the center locating element.

According to the provisions of the patent statues, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a device of the type described, three vertex locating elements defining the vertices of an equilateral triangle, a center locating element within the triangle, means for simultaneously moving two of those vertex elements along two sides of the triangle towards and away from the third vertex element to define equilateral triangles of varying size, and means for simultaneously positioning the center locating element at the intersection of two straight lines, one of said lines bisecting the third vertex angle and the other of said lines bisecting one of the other vertex angles.

2. Apparatus according to claim 1, in which the center locating element is provided with radially extending means rotatably mounted thereon for measuring the radius and concentricity of a surface of revolution contacting each of the vertex locating elements.

3. In a device of the type described, means defining three straight reference lines converging in a plane to a fixed reference point, the first and second reference lines including an angle of 60° and the third reference line bisecting that angle, means defining first and second movable reference points movable only along the first and second reference lines, respectively, means defining a center reference point movable only along the third reference line, a movable trammel secured to the means defining the first movable reference point and disposed in fixed angular relation to the reference lines, a first guide means on the trammel for limiting relative movement between the trammel and the means defining the second movable reference point to a defined straight line passing through the first movable reference point and disposed at an angle of 60° to each of the first and second reference lines, a second guide means on the trammel for limiting relative movement between the trammel and the means defining the center reference point to a defined straight line bisecting the angle between the first reference line and the line defined by the first guide means.

4. Apparatus according to claim 3, in which the fixed reference point and the means defining each of the first and second movable reference points are represented by contact points adapted to contact a surface of revolution to be measured.

5. Apparatus according to claim 3, in which the means defining the first movable reference point includes a slide member movable along the first reference line and a locating element mounted on the slide member, and in which the means defining the second movable reference point includes a second slide member movable along the second reference line and a third slide member mounted on the second slide member and movable along the line defined by the first guide means and a locating element mounted on the second and third slide members, and in which the means defining the center locating element includes a fourth slide member movable along the third reference line and a fifth slide member mounted on the fourth slide member and movable along the line defined by the second guide means and a center defining element mounted on the fourth and fifth slide members.

6. Apparatus according to claim 1, in which the means for moving two of the vertex elements includes separate means limiting movement of those vertex elements to separate straight reference lines that converge in a plane to the third vertex element at an angle of 60° and also includes a trammel rigidly connected to the first movable vertex element in fixed angular relation to the reference lines and a first guide means on the trammel limiting movement of the second movable vertex element relative to the trammel to a defined straight line passing through the first movable vertex element and disposed at an angle of 60° to the reference lines, and in which the means for positioning the center locating element includes means limiting the movement of that element to a third reference line bisecting the third vertex angle and also includes a second guide means on the trammel for limiting movement of the center locating element relative to the trammel to a straight line bisecting the angle between the first reference line and the line defined by the first guide means.

7. A radius and concentricity gauge for ringlike solids of revolution, comprising a bed plate provided with three grooves converging to a fixed locating element, the first and second grooves including an angle of 60° and the third groove bisecting that angle, a first and second movable locating element slidably received in the first and second grooves, respectively, a center locating element slidably received in the third groove, the fixed locating element and the first and second movable locating elements each having a reference point adapted to contact a surface of revolution to be measured, a trammel rigidly secured to the first movable locating element and disposed in fixed angular relation to the grooves, a first guide means in the trammel for slidably receiving the second movable locating element and for limiting movement of the reference point on that element relative to the trammel to a defined straight line passing through the reference point on the first movable locating element and making an angle of 60° to the first and second grooves, whereby said reference points will define the vertices of an equilateral triangle, a second guide means in the trammel for slidably receiving the center locating element and for limiting movement of that element relative to the trammel to a straight line bisecting the angle between a straight line connecting the reference points of the fixed locating element and the first movable locating element and the line defined by the first guide means, whereby the center locating element will define the center of a circle contacting said reference points, and gauge means rotatably mounted on the center locating element for measuring the radius and concentricity of said surface.

References Cited in the file of this patent

UNITED STATES PATENTS

| | | |
|---|---|---|
| 1,308,324 | Bellard | July 1, 1919 |
| 1,403,156 | Gonzalez | Jan. 10, 1922 |